United States Patent
Hahn et al.

(10) Patent No.: US 6,804,109 B1
(45) Date of Patent: Oct. 12, 2004

(54) SOLID ELECTROLYTE CAPACITOR HAVING TRANSITION METAL OXIDE UNDERLAYER AND CONDUCTIVE POLYMER ELECTROLYTE

(75) Inventors: Randolph S. Hahn, Simpsonville, SC (US); Brian J. Melody, Greer, SC (US); John T. Kinard, Greer, SC (US); Kimberly L. Pritchard, Mauldin, SC (US); Elisabeth Crittendon Key, Greenville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 10/689,142

(22) Filed: Oct. 20, 2003

(51) Int. Cl.$^7$ ................................. H01G 4/06
(52) U.S. Cl. .................. 361/524; 361/525; 29/25.03
(58) Field of Search ................ 361/523, 524, 361/528–529, 525; 29/25.03

(56) References Cited

U.S. PATENT DOCUMENTS

| | | |
|---|---|---|
| 1,906,691 A | 5/1933 | Lilienfeld |
| 3,093,883 A | 6/1963 | Haring et al. |
| 3,345,544 A | 10/1967 | Metcalfe |
| 4,910,645 A | 3/1990 | Jonas et al. |
| 5,716,511 A | 2/1998 | Melody et al. |
| 6,001,282 A | 12/1999 | Kanase |
| 6,056,899 A | 5/2000 | Lessner et al. |
| 6,162,345 A | 12/2000 | Kinard et al. |
| 6,324,050 B1 | 11/2001 | Kobatake et al. |
| 6,409,905 B1 | 6/2002 | Melody et al. |
| 6,480,371 B1 | 11/2002 | Kinard et al. |
| 6,540,900 B1 | 4/2003 | Kinard et al. |

OTHER PUBLICATIONS

*Solid Acids and Bases, their catalytic properties*, by Kozo Tanabe, Kodansha, Tokyo, *Academic Press*, New York—London, 1970.

*Failure Mechanism of Solid Tantalum Capacitors*, by Goudswaard et al., *Electrocomponent Science and Technology*, 1976, vol. 3, pp. 171–179.

*High Field Ionic Conduction in Tantalum Anodic Oxide Films with Incorporated Phosphate*, by Oca et al., *Journal of the Electrochemical Society*, vol. 117, No. 13, Dec. 1970, USA.

*The Heat–Treatment of Anodic Oxide Films on Tantalum*, by Smyth et al, *Journal of the Electrochemical Society*, Feb., 1966.

*Primary Examiner*—Anthony Dinkins
(74) *Attorney, Agent, or Firm*—J. Herbert O'Toole; Nexsen Pruet LLC

(57) ABSTRACT

A solid electrical capacitor having lowered ESR and fewer short circuit from processing is obtained by adhering a number of islands of a material more basic than the dielectric coating on an anode before forming a conductive polymer on the dielectric coating by a chemical oxidation process.

15 Claims, No Drawings

SOLID ELECTROLYTE CAPACITOR HAVING TRANSITION METAL OXIDE UNDERLAYER AND CONDUCTIVE POLYMER ELECTROLYTE

FIELD OF THE INVENTION

This invention relates to methods for improving the adherence of intrinsically conductive organic polymers to anodic valve metal dielectric films and capacitors prepared by use of the method which exhibit reduced frequency of short failures and reduced equivalent series resistance (ESR).

BACKGROUND AND PRIOR ART

Electrolytic capacitors having aluminum anode and cathode foils separated by layers of absorbent paper, wet with an liquid electrolyte, have been an item of commerce since the 1920's, as have electrolytic capacitors having a powder metallurgy tantalum anode impregnated with a highly conductive liquid electrolyte (such as an aqueous solution of sulfuric acid or lithium chloride). There are many liquid electrolyte solutions which have been proposed and/or adopted for use in electrolytic capacitors. Some of these electrolyte solutions contain materials which render them solids or semisolids at room temperature. Mannitol, various gums, poly-vinyl-pyrrolidone, etc. have been employed in capacitor electrolyte fabrication for the purpose of increasing the sparking voltage, increasing the viscosity (to the point of solidity at room temperature) or reducing the vapor pressure of electrolyte solutions. Despite the addition of materials to liquid electrolyte solutions which tend to thicken or solidify these solutions, they remain essentially liquids and conduct current by an ionic conduction mechanism.

It was recognized fairly early in the development of electrolytic capacitors that true solid-state conductors would have to be found which were compatible with the anodic oxide films covering the valve metal anodes used in electrolytic capacitors to substantially reduce the resistance of the cathode layer and overall resistance of these devices. In 1933, J. E. Lilienfeld obtained a patent (U.S. Pat. No. 1,906,691) covering the use of true, solid-state cathode materials, such as cuprous sulfide, cupric oxide, copper/cupric oxide combinations, lead oxide, etc., covered by a layer of silver, nickel, aluminum, copper, etc., for the purpose of reducing device resistance.

Lilienfeld's solid capacitors apparently never went into production due to the onset of the Great Depression.

A successful solid-state electrolytic capacitor was patented by Haring et. al., in 1963 (filed on Apr. 2, 1953), U.S. Pat. No. 3,093,883. This device employs pyrolytic manganese dioxide (produced via the pyrolysis of aqueous manganese nitrate solutions) as the cathode material.

In a 1967 patent (U.S. Pat. No. 3,345,544), Metcalfe extended the manganese dioxide cathode technology to include anodized aluminum foil anodes. Metcalfe's major finding was that, in order to resist the corrosive effects of manganese nitrate pyrolysis, the aluminum anode foil required phosphate and/or chromate anodizing electrolyte solutions (it has since been determined that anodic aluminum films formed in phosphate solutions consist largely (up to 90%) of aluminum phosphate, a very insoluble and non-reactive aluminum compound). Such films are better referred to as anodic layers than oxide layers.

The equivalent series resistance (E.S.R.) and dissipation factor (d.f.) tends to be much lower for capacitors fabricated with manganese dioxide cathode material than for equivalent capacitance capacitors constructed with liquid electrolyte solutions due to the lower resistivity of manganese dioxide (1–3 orders of magnitude lower resistivity than liquid electrolyte solutions).

With the continuing development of ever-faster microprocessors and lower-voltage logic circuits, the demand for lower E.S.R. capacitors for use in conjunction with faster micro-processors has motivated capacitor manufacturers to develop solid state cathode materials which are more conductive (less electrically resistive) than manganese dioxide.

In the early 1980's, aluminum electrolytic capacitors were introduced which were fabricated having a T.C.N.Q.-amine complex acting as the cathode. These capacitors established the stability and high conductivity achievable with solid-state organic cathode materials. The ongoing effort to increase the maximum temperature capability of organic cathode electrolytic capacitors has led to the development of methods of capacitor fabrication employing intrinsically conductive organic polymers, such as polypyrrole, polythiophenes such as polyethylene dioxythiophene, polyanilines and polyacetylenes. Numerous substituted monomers (derivatives) are useful as are mixtures of two or more monomers from different types, i.e., mixtures. These are relatively high molecular weight materials which possess electrical conductivity along a poly-acetylene-like backbone contained within the polymer and as such there is minimal interfacial resistance such as is encountered by electrons traveling through the myriad of layers of charge-transfer complexes, such as the T.C.N.Q. or T.C.N.E. charge transfer complexes. As a result of the higher molecular weight, intrinsically conductive organic polymers not only tend to possess higher conductivity than charge-transfer complexes, but also tend to exhibit higher thermal stability. While charge-transfer complexes tend to become unstable at temperatures above about 105° C., intrinsically conductive polymers, such as polyethylene dioxythiophene, exhibit high temperature stability to 150° C. or even 175° C. in the absence of atmospheric oxygen.

There are two routes used to deposit intrinsically conductive organic polymers on electrolytic capacitor anode bodies:
1) Chemical
2) Electrochemical The first of these approaches is well described in U.S. Pat. No. 4,910,645, to Jonas et. al., and consists of immersing the anodized substrate sequentially in an aqueous solution of an oxidizing agent such as, but not necessarily limited to, ammonium persulfate, and a dopant acid and/or a salt of a dopant acid, such as p-toluene sulfonic acid or sodium p-toluene sulfonate [Intrinsically conductive organic polymers generally contain one dopant acid anion for each 3 to 4 monomer units which have been joined to form the polymer. The presence of a strong dopant acid anion is thought to result in a delocalization of electric charge which provides electrical conductivity]. After a drying step, conducted to free the pores of the anode bodies from the water portion of the oxidizer/dopant solution, the anode bodies are then immersed in a solution of the monomer, usually dissolved in at least a partially organic solvent such as a low molecular weight alcohol, etc. Once the solution of monomer, which may consist entirely of monomer, is introduced into the capacitor anode bodies, the anodes are allowed to stand, generally in an oven above room temperature, to facilitate production of the intrinsically conductive polymer material. Repeat dipping sequences may be employed to more completely fill the pore structure of the anode bodies. In practice, rinsing cycles are generally employed to remove reaction by-products, such as ammonium sulfate, sulfuric acid, iron salts (when an iron (III) oxidizer is employed), or other by-products depending on the system employed. Chemical production of intrinsically conductive organic polymers may also be carried-out with capacitor anode bodies by first introducing the monomer to the capacitor bodies, followed by introduction of the oxidizer and dopant (the reverse order of polymer pre-cursor introduction described above). It is also possible to mix the dopant acid(s) with the monomer solution rather than with the oxidizer solution if this is found to be advantageous. U.S. Pat. Nos. 6,001,282 and 6,056,899 describe a chemical means of producing an intrinsically conductive organic polymer through the use of a single solution which contains both the monomer and the oxidizing agent, which has been rendered temporarily inactive via complexing with a high vapor pressure solvent. As the solution is warmed and the inhibiting solvent evaporates, the oxidative production of conductive polymers ensues. The dopant acid anion is also contained in the stabilized poly-precursor solution.

The second approach to the production of intrinsically conductive organic polymers within capacitor anode bodies is electrochemical. U.S. Pat. No. 6,324,050 describes a method of producing a solid-state electrolytic capacitor by completely coating the interstices of an anodized valve metal anode body with a continuous layer of manganese dioxide, then through an electrical contact contacting the aforesaid manganese dioxide layer, immersing the anode bodies in an electrically conductive solution of conductive polymer pre-cursor monomer and dopant acid anions, then passing current through the manganese dioxide layer (which is biased positive relative to the solution) in order to deposit a conductive polymer coating atop the continuous manganese dioxide layer. Washing steps, etc. may be carried-out following the polymer production step.

The polymer coated capacitor anode bodies, coated either chemically or electro-chemically with an intrinsically conductive organic polymer cathode layer, may then be processed into completed capacitors by coating the conductive polymer cathode coatings with graphite paste, conductive paint, etc., as is well known to those skilled in the art.

Electrical "aging" or "reform" steps may be carried-out between and/or after the polymer production steps in order to improve the leakage current performance of the finished capacitors, as is well known to those skilled in the art of capacitor manufacture.

The demand for capacitors exhibiting lower equivalent series resistance and dissipation factor, which has led to the development of electrolytic capacitors containing conductive polymer cathode materials, has been accompanied by a demand for capacitors exhibiting higher reliability, particularly a lower incidence of high leakage current/short circuit failures. The quality and stability of the anodic oxide dielectric film is the most fundamental aspect of electrolytic capacitors so far as the reliability of these devices is concerned. It has long been known that the life expectancy of "solid" (i.e., solid-state cathode) tantalum capacitors, expressed as failure rate, is an inverse exponential function of the field existing across the dielectric during use (see, for example, the paper, entitled "Failure Mechanism of Solid Tantalum Capacitors", by B. Goudswaard F. J. J. Driesens, which appeared in "Electrocomponent Science and Technology", Vol. #, pp. 171–179, 1975).

In addition to the relationship between the oxide dielectric thickness and device reliability, the chemistry of dielectric films and dielectric film growth has been investigated extensively. It is known that anodic oxide films grown on tantalum in phosphate solutions tend to have fewer crystalline oxide flaws than with other electrolyte solutions (See, for example, "High Field Ionic Conduction in Tantalum Anodic Oxide Films With Incorporated Phosphate", by C. J. Dell'Oca and L. Young, last paragraph. This paper appeared in "The Journal of the Electrochemical Society", Vol. 117, No. 12, December, 1970, pp. 1548–1551.). The presence of incorporated phosphate in anodic tantalum oxide dielectric films is also known to inhibit oxygen migration through these films. The phosphate is present in the outer portions of the films (i.e. the portion produced by tantalum ion migration) and the outer, phosphate-containing region is a greater fraction of the total film thickness, contains a higher concentration of phosphate, and is more resistant to oxygen migration degradation as the concentration of phosphate in the anodizing electrolyte is increased (c.f. "The Heat-Treatment of Anodic Oxide Films on Tantalum IV. Anodization in Phosphoric Acid Solutions" by D. M. Smyth, T. B. Tripp, and G. A. Shirn, "Journal of the Electrochemical Society", Vol. 113, No. 2, February, 1966, pp. 100–104.).

Due to the observed higher film quality (i.e. fewer flaws) and higher film thermal stability observed with higher phosphate content anodic tantalum oxide dielectric films, a great deal of effort has been expended in the development of high phosphate content anodizing electrolytes, as reflected in U.S. Pat. Nos. 5,716,511, 6,162,345, and 6,480,371. The electrolyte compositions covered by these patents allow the use of relatively high (up to 10%) phosphate content solutions for high phosphate incorporation into the anodic oxide while maintaining product throughput and ease of use necessary for mass production.

As mentioned above, anodic films formed on aluminum capacitor substrates in phosphate solutions are also much more stable with respect to hydration degradation than are films formed in non-phosphate solutions (c.f. U.S. Pat. No. 3,345,544, Metcalfe). The anodizing of aluminum foil in phosphate solutions has traditionally been accompanied by a significant amount of corrosion of the foil to form aluminum phosphate particles which must be removed from the anodizing electrolyte. The degree of corrosion is particularly severe with highly etched foil and, especially higher anodizing voltages. Recently, processes have been developed which facilitate high-voltage anodizing (U.S. Pat. No. 6,409,905) and reel-to-reel anodizing (U.S. Pat. No. 6,540,900) of aluminum capacitor foil in phosphate solution with much lower amounts of foil corrosion than was found with earlier phosphate anodizing systems.

With systems available to produce high phosphate content anodic films on tantalum, aluminum and niobium for high anodic film stability, and the need for minimal E.S.R., anode bodies coated with high phosphate content anodic dielectric films have been coated by chemical oxidation processes with intrinsically conductive organic polymers and processed into finished capacitors. Unfortunately, the equivalent series resistance and leakage current for these devices was higher than anticipated and the capacitance was lower than anticipated, both suggesting a weak attachment of the conductive polymer to the anodic film substrate.

One aspect of high phosphate content anodic oxide dielectric films is that the anodic oxide becomes more acidic as the proportion of acid phosphate is increased. An example of the rapid increase in acidity with increasing phosphate content is given for bulk aluminum oxide in "Solid Acids and Bases, Their Catalytic Properties" (by Kozo Tanabe, 1970, Kodansha, Tokyo, Academic Press), on page 89, in which a doubling of the phosphate content, from 0.1 to 0.2 mmol/gram, increases the surface acid strength by 6 orders of magnitude.

Unfortunately, highly acidic surfaces do not tend to wet well with solutions of the highly acidic dopants which are used to dope intrinsically conductive organic polymers (as described in U.S. Pat. No. 4,910,645, Jonas, et. al.). We have traced at least a major portion of the excessively high leakage currents and equivalent series resistance observed with valve metal capacitor bodies anodized in phosphate and coated with chemically produced conductive polymers which have good conductivity to the absence of good attachment of the conductive polymer to the underlying anodic film surface. While not being bound by any theory, it is believed that the acidic nature of the dopant solution and the resulting conductive polymer inhibits the wetting of the acidic anodic film by the dopant and resulting polymer, thus limiting the adherence of the polymer to the anodic dielectric film.

DESCRIPTION OF THE INVENTION

We have found that a thin, intermittent deposit of a basic metal oxide (i.e. a metal oxide capable of reacting as a basic material in the presence of an acid) upon the acidic, phosphate-containing anodic film acts to supply a myriad of points of connection between the anodic film and the conductive polymer. The resultant change in adhesion can be seen in lower equivalent series resistance and leakage current values.

A convenient method of producing a thin, intermittent coating of a basic or amphoteric oxide atop the anodic oxide is the pyrolytic production of metal oxides or dioxides from a dilute solution of metal salts, especially nitrates. Representative metals include Sn, Sb, Pb, Cu and Ga. The most convenient is Mn which converts from the nitrate to the dioxide at ca. 250° C. in steam. This process is well known in the capacitor industry as evidenced by the patent to Haring. One to three immersions of anodized capacitor bodies in approximately 5% manganese dioxide (approximately 1.05 sp. gr.) followed by pyrolysis at 250° C.±25° C. in steam is sufficient to produce the thin, intermittent coating desired. Manganese dioxide coatings produced as described above cover less than 25% of the desired valve metal body surface and generally less than about 10% of the surface as indicated by S.E.M. approximation. The coating is in the form of discontinuous or noncontiguous islands. For example, if a tantalum anode is anodized and given 2 pyrolytic coatings from a 5% manganese nitrate solution, the coated anode may be overcoated with a conductive silver paste and dried. When the "capacitor" is tested on a capacitance bridge, the capacitance is only that of the outer surface shell of the anode. No cathode connection to the internal dielectric film is observed; i.e., the manganese dioxide coating is non-contiguous and non-conducting by electrical measurement, confirming the S.E.M. examination results. Since the conductivity of manganese dioxide is not required, the specific metal salt is not critical except that it must wet the anodic film, convert to an oxide under mild conditions (such as heat) which do not affect the film and stick to the anodic film surface sufficiently to change the effective acidity of the surface upon which the conductive polymer if formed.

EXAMPLE 1

A batch of tantalum anodes was anodized to 90 volts in an electrolyte solution containing a relatively high amount of phosphate (2.4% wgt/vol $H_3PO_4$). The anodes were heat-treated at 350° C. for 30 minutes and were then given a second anodizing step at 90 volts in the same electrolyte. The batch was then split into 2 groups:

Group A—Controls
Group B—Received 2 coatings of manganese dioxide via dipping in an approximately 5% manganese nitrate solution followed by pyrolysis at 250°–260° C. in steam for 4 minutes.

The groups were then recombined and were coated with polyethylene dioxythiophene following the method of Jonas (U.S. Pat. No. 4,910,645). The anodes were then processed into finished capacitors and were electrically tested, the only intentional difference between the two groups being the manganese dioxide coating added to Group B.

| No. of Parts | PPM | Shorts | Capacitance | E.S.R. |
| --- | --- | --- | --- | --- |
| Group A | 2493 | 5155 | 14.3 µF | 0.0577 Ω |
| Group B | 2540 | 1570 | 14.9 µF | 0.0322 Ω |

The above data show significant reductions in device E.S.R. (approximately 44%) and short failures approximately 70%) and a small improvement in capacitance for the anodes of Group B which received the manganese dioxide coating. This indicates that in spite of the thin, intermittent nature of the manganese dioxide coating, sufficient points of attachment exist to provide measurably better contact between the anodized substrate and the conductive polymer.

We claim:

1. A solid electrolytic capacitor formed from a valve metal having a dielectric film formed there-upon by an anodic oxidation process including a phosphate containing electrolyte, a non-contiguous, non-conducting coating of a metal oxide more basic than said dielectric film formed on a portion of said film, a conductive polymer formed by a chemical oxidation process formed upon said film and said coating of a metal oxide and means for electrical connection to said valve metal and to said conductive polymer.

2. A solid electrolytic capacitor according to claim 1 wherein said valve metal is selected from the group consisting of aluminum, tantalum and niobium.

3. A solid electrolytic capacitor according to claim 1 wherein said metal oxide is selected from the group consisting of manganese dioxide, lead dioxide, tin dioxide, diantimony trioxide, and cupric oxide.

4. A solid electrolytic capacitor according to claim 3 wherein said metal oxide is manganese dioxide.

5. A solid electrolytic capacitor according to claim 1 wherein said conductive polymer is selected from the group consisting of polypyrrole, polythiophene, polyaniline, polyacetylene and derivatives and mixtures thereof.

6. A solid electrolytic capacitor according to claim 4 wherein said conductive polymer is a polyethylene dioxythiophene.

7. A method for making a solid electrolytic capacitor comprising:
   a) anodically oxidizing a coupon formed from a valve metal in an electrolyte containing a phosphate;
   b) coating said anodized coupon with a metal salt in a dilute aqueous solution thereof;
   c) converting said salt to an oxide which is in the form of non-contiguous, non-conducting islands;
   d) forming a conductive polymer upon said anodized coupon and said oxide by a chemical oxidation method; and
   e) connecting said valve metal and said conductive polymer to separate electrical leads.

8. A method according to claim 7 wherein said anodic oxidation is performed in an electrolyte solution containing a high amount of phosphate.

9. A method according to claim 8 wherein the electrolyte solution contains between 1 and 10% (wgt/vol) phosphate.

10. A method according to claim 7 wherein the metal in said metal salt is selected from the group consisting of manganese, lead, tin, antimony, gallium and copper.

11. A method according to claim 10 wherein the metal is manganese.

12. A method according to claim 7 wherein the metal salt is manganese nitrate.

13. A method according to claim 7 wherein said conductive polymer is selected from the group consisting of polypyrrole, polythiophene, polyaniline, polyacetylene and derivatives and mixtures thereof.

14. A method according to claim 13 wherein said conductive polymer is a polyethylene dioxythiophene.

15. A method to adjust the effective acidity of an anodic film on a value metal comprising depositing upon the surface of said film a non-contiguous, non-conductive oxide of a metal selected from the group consisting of manganese, lead, copper (II) and tin.

\* \* \* \* \*